(12) United States Patent
Stopa

(10) Patent No.: US 7,116,294 B2
(45) Date of Patent: Oct. 3, 2006

(54) LED DRIVER CIRCUITS

(75) Inventor: James L. Stopa, Old Saybrook, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 322 days.

(21) Appl. No.: 10/359,827

(22) Filed: Feb. 7, 2003

(65) Prior Publication Data

US 2004/0155844 A1 Aug. 12, 2004

(51) Int. Cl.
*G09G 3/32* (2006.01)

(52) U.S. Cl. .......................................... 345/82; 345/83

(58) Field of Classification Search .................. 345/82, 345/204, 1, 4, 903, 83; 361/267, 249, 86; 250/252.1; 340/639, 691.1, 475, 469; 362/249, 362/267, 200; 315/179, 169.1; 396/157; 327/538

See application file for complete search history.

(56) References Cited

U.S. PATENT DOCUMENTS

| | | | | |
|---|---|---|---|---|
| 3,784,844 A * | 1/1974 | McGrogan, Jr. | ............. | 327/538 |
| 4,141,000 A * | 2/1979 | Thomas et al. | ............. | 345/183 |
| 4,285,582 A * | 8/1981 | Yamazaki | ................... | 396/157 |
| 4,654,629 A | 3/1987 | Bezos | | |
| 5,086,506 A * | 2/1992 | Hall et al. | ...................... | 455/8 |
| 5,157,382 A * | 10/1992 | Stopa | ......................... | 340/475 |
| 5,231,373 A * | 7/1993 | Freeman et al. | ............ | 340/469 |
| 5,796,376 A * | 8/1998 | Banks | ........................ | 345/82 |
| 5,909,180 A * | 6/1999 | Bailey et al. | ................ | 340/639 |
| 6,018,219 A * | 1/2000 | Komarek et al. | ........... | 315/194 |
| 6,317,052 B1 * | 11/2001 | Welling et al. | .......... | 340/691.1 |
| 6,331,062 B1 * | 12/2001 | Sinclair | ....................... | 362/200 |
| 6,461,019 B1 * | 10/2002 | Allen | ........................ | 362/249 |
| 6,483,254 B1 | 11/2002 | Vo et al. | ................... | 315/241 S |
| 6,486,607 B1 * | 11/2002 | Yeuan | ...................... | 315/169.1 |
| RE37,970 E * | 1/2003 | Costello, Jr. | ............. | 250/252.1 |
| 6,628,249 B1 * | 9/2003 | Kamikawa et al. | ........... | 345/44 |
| 6,636,003 B1 * | 10/2003 | Rahm et al. | ................. | 315/179 |
| 6,646,654 B1 * | 11/2003 | Takagi | ......................... | 345/690 |
| 6,798,152 B1 * | 9/2004 | Rooke et al. | ............ | 315/209 R |
| 6,831,821 B1 * | 12/2004 | Ohshima | ...................... | 361/86 |
| 2002/0163514 A1 * | 11/2002 | Nagai et al. | ................. | 345/204 |
| 2003/0102819 A1 * | 6/2003 | Min et al. | .................... | 315/291 |
| 2004/0165384 A1 * | 8/2004 | Allen | ......................... | 362/267 |

* cited by examiner

*Primary Examiner*—Bipin Shalwala
*Assistant Examiner*—Prabodh Dharia
(74) *Attorney, Agent, or Firm*—Alix, Yale & Ristas, LLP

(57) ABSTRACT

Several driver circuits for energizing series arrays of LEDs are disclosed. The LED driver circuits incorporate programmable microcontrollers and switching regulators in circuits that permit precise control of current applied to the series array of LEDs. One driver circuit senses the condition of a SYNC line such that the light emission pattern of multiple LED light sources, each with a driver circuit connected to the SYNC line may be coordinated without need for a central controller. Another driver circuit applies an overdrive current to the LEDs for a first pre-determined time period, then ramps down the applied current to a sustainable level. A four channel driver circuit provides each channel with electronic switches arranged to simultaneously turn on and electrically connect a constant current source to an LED array, resulting in abrupt turn on and turn off of the LEDs.

24 Claims, 16 Drawing Sheets

FIG. 1B

LED DRIVER CIRCUITS

FIELD OF THE INVENTION

The present invention relates to driver circuits for use with LED (light emitting diode) light sources, and more specifically, to circuits that provide improved control over light production from such LED light sources.

BACKGROUND OF THE INVENTION

Light Emitting Diodes (LEDs) are extremely durable and efficient sources of light. Recent developments in LED technology have resulted in components that can be combined into arrays having a brightness and light emission pattern comparable with light sources such as halogen bulbs and xenon flash tubes. Among other attractive characteristics such as durability and energy efficiency, LEDs have a very fast turn-on time of approximately 20 µS that is comparable with the turn on time of a xenon flash tube. If properly energized, an LED array can simulate the light-emission pattern of any pre-existing light source, including a xenon flash tube.

LEDs are solid-state components whose light output (luminous flux) increases in proportion to the applied forward current. However, excessive current through an LED generates heat that can damage the device. Each LED develops a forward voltage $V_F$ that varies with the color of the LED as well as the ambient temperature. LED manufacturers typically rate each type of LED for continuous operation at an average forward current $I_{Avg}$. Each type of LED is also rated for momentary operation at a peak pulsed forward current $I_{Peak}$. Application of $I_{Peak}$ to an LED produces increased brightness when compared to an LED energized by application of $I_{Avg}$. This peak brightness is particularly desirable in warning lights used in conjunction with emergency vehicles, aircraft, traffic signaling, etc. However, continuous application of $I_{Peak}$ would result in excessive heat and damage or failure of the LED. There is a need in the art for LED driver circuits that permit precise control of the pattern and quantity of current applied to an LED array to produce a light emission pattern of maximum intensity without overheating the LEDs.

It is desirable that each LED driver circuit generate the requisite controlled current over a range of output voltages to accommodate variation not only in the ambient temperature and the type of LED employed but also variation of the number of LEDs being driven. Constant current sources suitable for such an application are known in the art. One approach is to employ a chip called a switching regulator to control the applied current by varying the duty cycle of energy applied to the LEDs. The switching regulator is responsive to a current sensing circuit to control the applied current. In this manner, circuits can be configured to apply controlled currents to a series array of LEDs over a range of output voltages. For example, a switching regulator configured as a buck converter circuit may be used to produce controlled current over a range of voltages less than the available input voltage, while a boost converter may be used to produce controlled current over a range of voltages greater than the available input voltage.

Maximum flexibility in terms of output voltage range allows a single driver circuit (also referred to as a ballast) to be used in conjunction with different numbers of LEDs of different types and over a range of ambient temperatures. Those of skill in the art will recognize that the design and manufacture of a driver circuit for each individual LED in an array or for each array having a particular number of LEDs is not cost-efficient. Therefore, there is a need in the art for multi-purpose LED driver circuits for energizing LED light sources that incorporate different numbers and/or types of LEDs.

Warning light arrays for emergency vehicles and aircraft may require coordinated light emission from several light sources arranged at various points on the vehicle or aircraft. This has typically been accomplished by use of a central controller. The central controller stores light emission patterns which are applied in a coordinated manner to energize the several light sources to produce the coordinated pattern of light emission. Such pre-existing warning light arrays may employ prior art light sources such as halogen bulbs and/or xenon flash tubes as emitters. Many operators of fleet vehicles and aircraft are desirous of replacing the prior art light sources to take advantage of the superior durability and energy efficiency of LED light sources. Thus, there is a need in the art for LED driver circuits responsive to control signals from a central controller to energize an LED light source, such that the prior art light sources may be replaced without requiring replacement of the controller and/or the control wiring.

SUMMARY OF THE INVENTION

Several LED driver circuits are disclosed, each exemplary of several aspects of the invention. Each of the LED driver circuits employs a constant current source configured to apply a controlled current to a series array of LEDs. Each of the LED driver circuits is configured to provide controlled current to the series array of LEDs over a range of output voltages, thereby accommodating variation in the ambient temperature, the type of LED employed and the number of LEDs in the series array. The current source configuration is selected commensurate with the available input voltage and the number of LEDs in the series array. For example, in an automotive-type electrical system, the available input voltage is approximately 10–15VDC. A first exemplary driver circuit for use with such a vehicular electrical system employs a switching regulator in a buck converter configuration to provide controlled current for one to three series LEDs, e.g., over a voltage range of 2.5 to approximately 9 VDC. Another exemplary driver circuit for use with a vehicular electrical system uses a switching regulator in a boost converter configuration to provide controlled current to eight to twelve series LEDs, e.g., over a range of voltages between 18 and 45 VDC.

The driver circuits each employ circuits to detect excessive current at the output of the current source and are responsive to an overcurrent indication to shut down the current source. Each of the driver circuits also include electromagnetic interference (EMI) filtering to prevent interference with other systems, in particular radio communications systems prevalent in emergency vehicles and aircraft.

One exemplary driver circuit includes a synchronization feature that eliminates the need for central control, or conversely, provides for distributed control over several light emitters. The driver circuits for the light emitters to be coordinated are connected to a common synchronization (SYNC) line. Each of the driver circuits is programmed to detect the condition of the SYNC line as part of the routine for applying a flash pattern to the LED light source. The first driver circuit to apply its flash pattern to the LED light source controls the flash pattern for all the synchronized driver circuits by applying a synchronization signal to the SYNC line. An embodiment of the driver circuit without the synchronization feature is responsive to control signals from a central controller.

A further aspect of the present invention provides a driver circuit with a phase-selection input. This allows driver circuits in a distributed control system to be configured for in-phase (simultaneous) or out-of-phase (alternating) light emission.

A feature of the driver circuit employing a switching regulator in a boost configuration is that an electronic switch is positioned to break the electrical connection between the LED array and the constant current source whenever the switching regulator is turned off. A further aspect of the invention is that the electronic switch is responsive to the same electronic signal that turns off the switching regulator to break the electrical connection between the constant current output and the LED array. This simultaneous switching produces an abrupt turn-off or removal of power from the LED array, improving the visual appearance of the emitted flashing pattern and improving the overall energy efficiency of the warning light. In addition, the electronic switch allows the input power to be isolated from the LED array to protect the driver circuit (and the vehicle electrical system) against an output short circuit.

An object of the present invention is to provide a new and improved driver circuit for an LED array that is cost effective, durable and versatile.

Another object of the present invention is to provide a new and improved driver circuit for an LED array whose energy output may be synchronized with other driver circuits without central control.

A further object of the invention is to provide a new and improved driver circuit for an LED array wherein the phase of flashing pattern initiation is selectable.

BRIEF DESCRIPTION OF THE DRAWINGS

These and other objects, features and advantages of the invention will become readily apparent to those skilled in the art upon reading the description of the exemplary embodiments, in conjunction with the attached drawings, in which:

FIG. 1B is an enlargement of the right portion of FIG. 1;

DETAILED DESCRIPTION OF THE PREFERRED EMBODIMENTS

The invention encompasses several exemplary LED driver circuits for applying controlled current to a plurality of light emitting diodes (LEDs).

Figure 1:
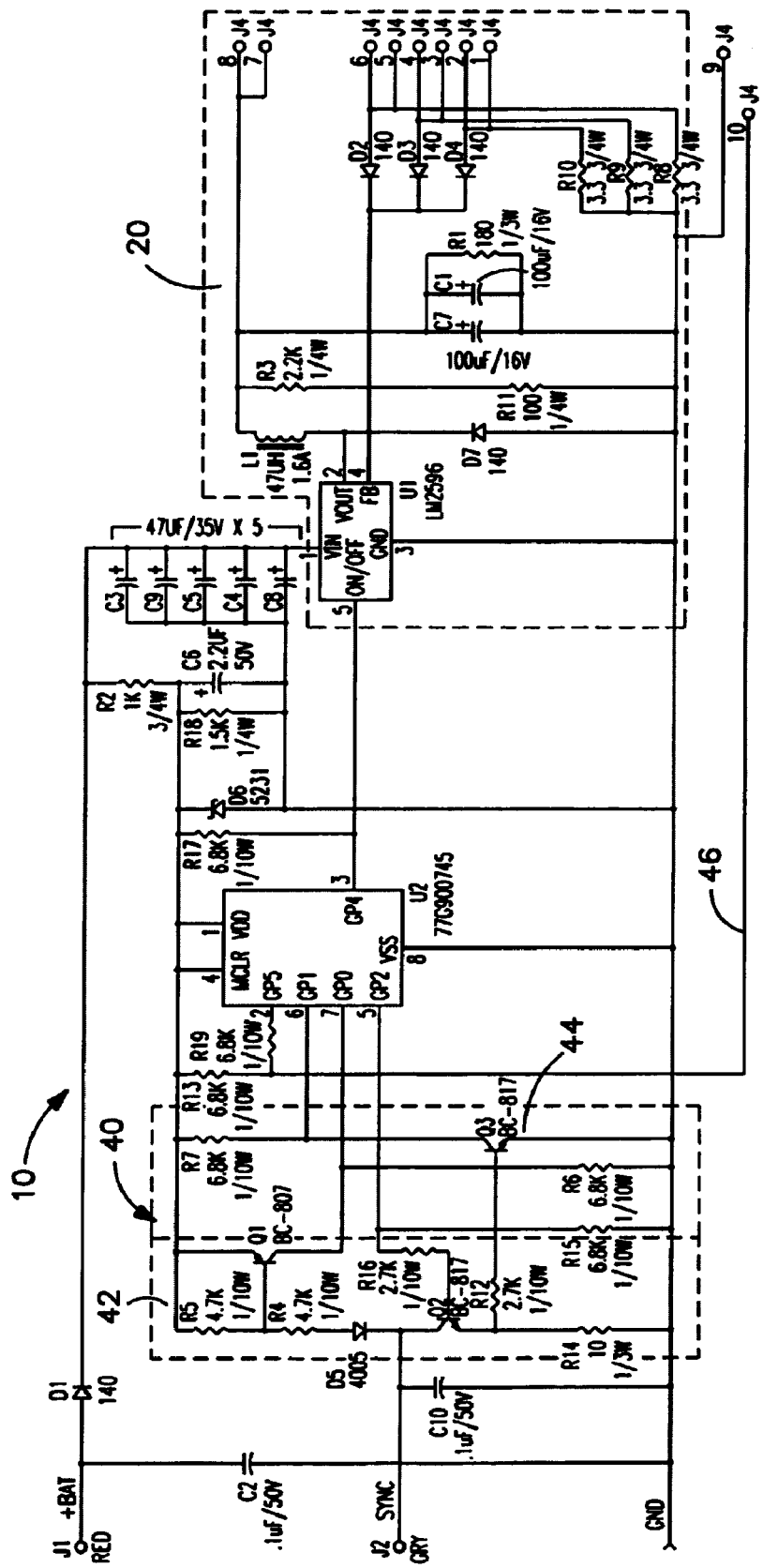
FIG. 1 is an electrical schematic of a first LED driver circuit exemplary of several aspects of the present invention.

A first exemplary embodiment of an LED driver circuit 10 will be described with reference to FIGS. 1, 1A, 1B, 2, 5, and 9A. FIG. 1B is a schematic of a constant current source 20 utilizing an LM 2596 series integrated circuit U1 of the type known as a switching regulator manufactured by National Semiconductor. The switching regulator U1 applies voltage pulses through an inductor L1 in series with an LED load at an operating frequency of 150 Khz. The illustrated power supply is a buck-type power supply configured to generate an overdrive current of approximately 450 mA across a series array of one to three LEDs at an output voltage of approximately 3 to 9 VDC.

A feedback input FB on the switching regulator U1 permits regulation of the duty cycle of the pulses VOUT applied to the inductor L1, which regulates the effective output current. Resistors R8, R9, and R10 are arranged in series with one pair of load LEDs 50 (see FIG. 1B). Schottky diodes D2, D3, and D4 couple the voltage generated across R8, R9 and R10, respectively, to the feedback input FB of the switching regulator U1. When the voltage generated across any one of resistors R8, R9, or R10 exceeds approximately 1.5 volts, the voltage applied to the feedback input exceeds 1.23 volts and indicates the need for a reduction in the duty cycle at the output VOUT. The illustrated arrangement provides a constant current source for 3 series pairs of LEDs connected between pin pair 7/8 of connector J4 and one of pin pairs 1/2, 3/4 or 5/6 of connector J4. When the current through any one of these pairs of LEDs exceeds approximately 450 mA, the voltage generated across the corresponding series resistor R8, R9, R10 provides a voltage at the feedback pin in excess of 1.23 volts. The switching regulator U1 modifies the duty cycle of the output VOUT to maintain the current through the LEDs and series resistor substantially constant. Resistors R3 and R11 provide a clamp circuit whose function is to provide the feedback input voltage at FB in the absence of a load across the output of the constant current source.

Figure 7:
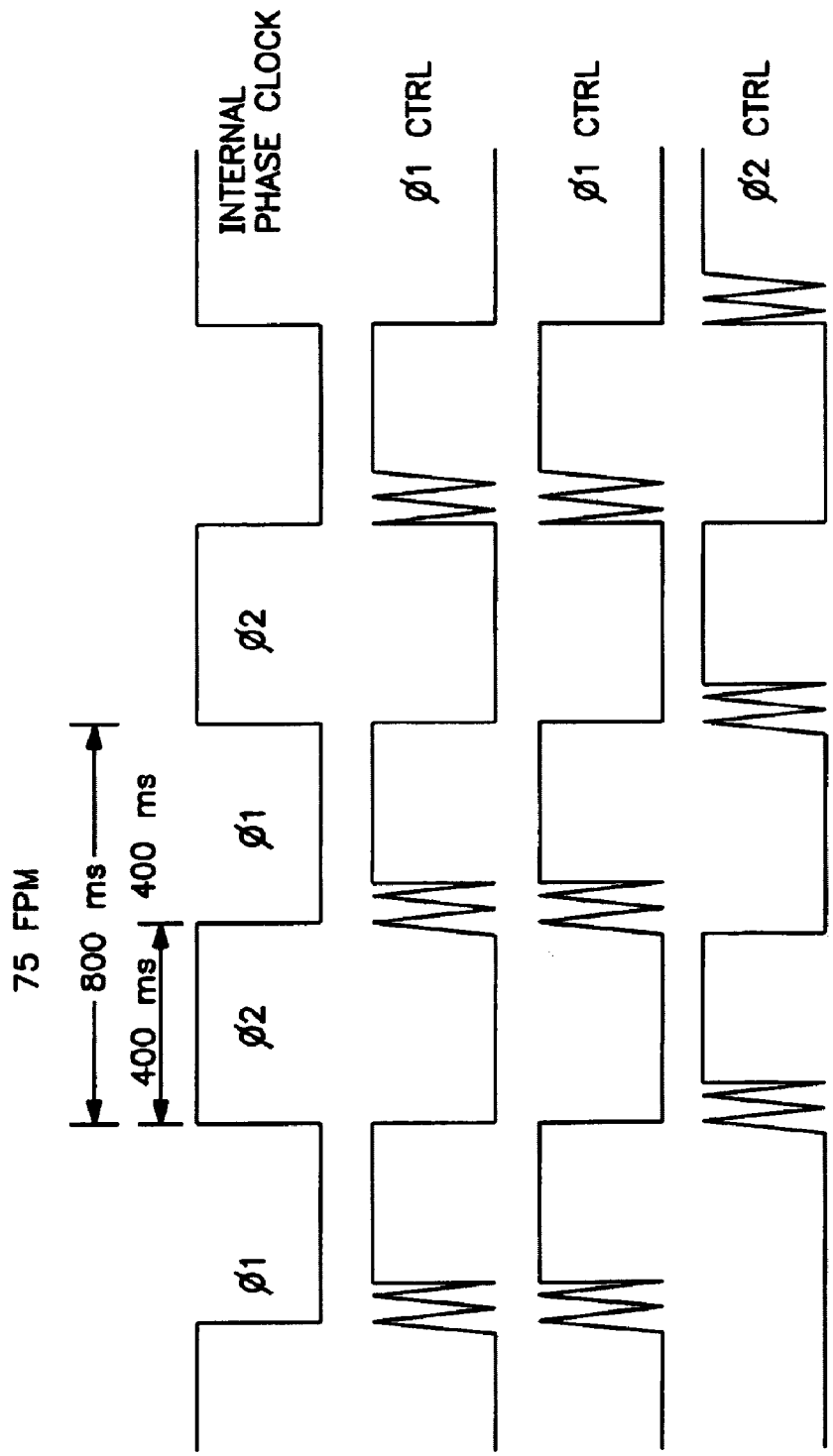
FIG. 7 illustrates the output of channels 1–3 of the warning light systems of FIG. 2 or 4 with respect to a phase reference.

The 450 mA current is described as an "overdrive current" because it exceeds the rated average current of between 350 mA and 385 mA recommended by the manufacturer Lumileds for the Luxeon one watt LEDs employed the exemplary embodiment. However, since the light pattern (as shown in FIG. 7) produced by the exemplary LED driver circuit 10 is a signal phase comprising a sequence of two short bursts and a longer burst, with all three bursts lasting a total of 400 mS. The signal phases of the light pattern are separated by idle periods of equal length (400 mS). In such a pattern, the average current through the LEDs does not exceed their rated average current. If the light pattern included long period of LED energization, for example, more than one second in duration, then the current applied to the series pair of LEDs would likely need to be reduced. This aspect of the invention will be further discussed below in association with an alternative embodiment 10a of the LED driver circuit 10. Overdriving the LEDs for brief periods maximizes the light output, thereby increasing the visual "punch" of the resulting pattern of light emission.

The illustrated LED driver circuit 10 incorporates a PIC12C519-04I/P 8 pin, 8 bit CMOS microcontroller U2 manufactured by Microchip Technology, Inc. (see FIG. 1A). The microcontroller U2 is programmed with firmnware to carry out several functions in the illustrated circuit. The microcontroller stores a pattern illustrated in FIG. 7. The microcontroller U2 applies this pattern to the ON/OFF input of the switching regulator U1 to produce a predetermined light output pattern from the LEDs connected across the output of the constant current source 20. The firmware in the microcontroller is also responsive to the voltage level applied to each of several input/output (I/O) ports on the microcontroller U2 identified as GP0, GP1, GP2 and GP5.

Figure 1A:
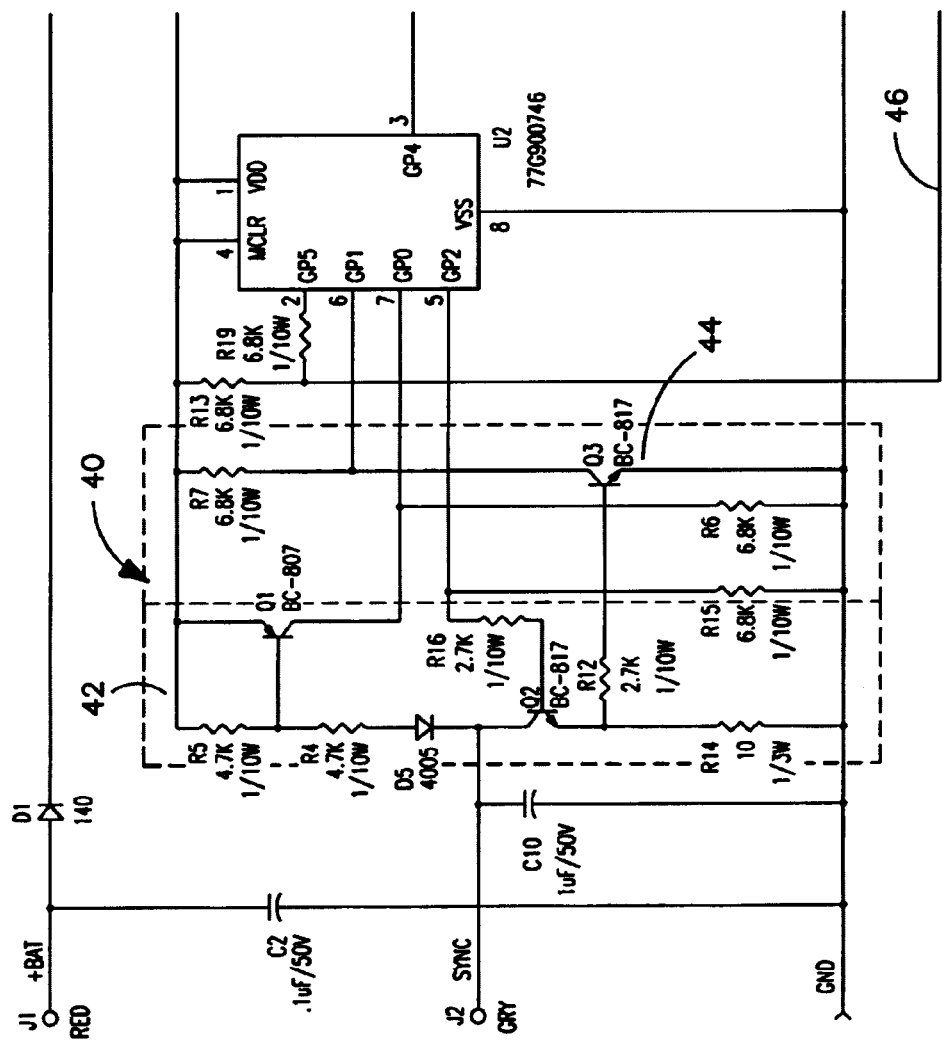
FIG. 1A is an enlargement of the left portion of FIG. 1.
Figure 1B:
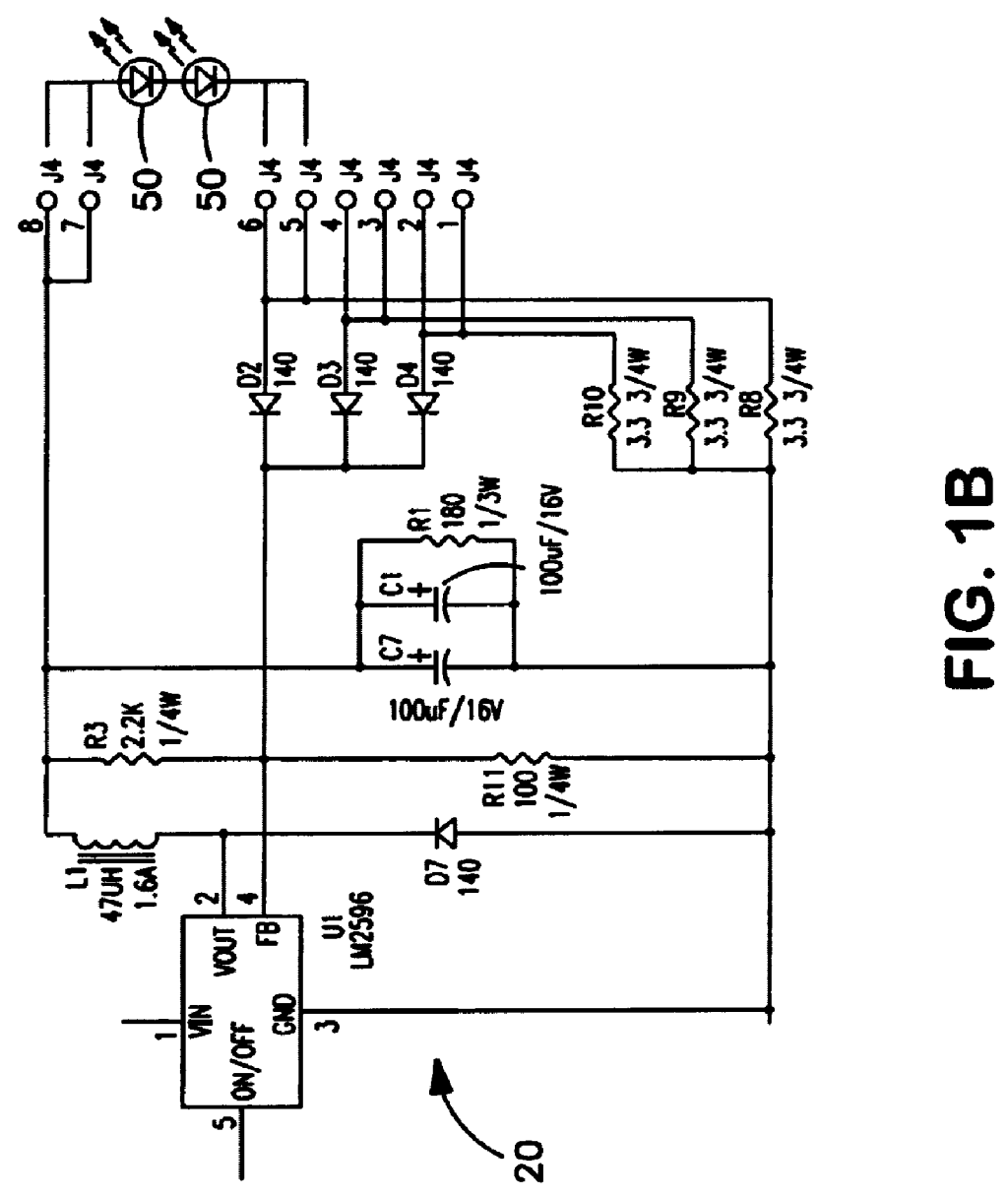

Voltage is applied to I/O ports GP0, GP1 and GP2 by a synchronizing circuit with over-current protection 40 best seen in FIG. 1A. The synchronizing circuit 42 comprises a pair of transistors Q1 and Q2. Transistor Q1 is arranged to sense the electrical state of a synchronizing line labeled SYNC. When the SYNC line goes low or is grounded, Q1 is turned on, placing a logic level high on I/O port GP0. A logic level high at I/O port GP0 tells the controller that another driver circuit connected to the SYNC line has taken control of the SYNC line. The firmware coordinates the timing of its flashing output at GP4 with the LED driver circuit in control of the SYNC line by adopting the timing of the LED driver circuit in control. This is implemented by firmware instructions to monitor the state of I/O port GP0. When GP0 is low when polled by the microcontroller U2, the microcontroller assumes it is in control of the SYNC line. When the microcontroller U2 is in control, it initiates the flash pattern at GP4 and applies a logic level high to I/O port GP2 corresponding to the beginning of the flash pattern according to the internal clock of the microcontroller. A high at GP2 turns on transistor Q2 which takes the SYNC line low indicating to other driver circuits sensing the SYNC line that the microcontroller U2 has initiated the flash pattern and should be followed.

Simply stated, if GP0 is high when by the microcontroller U2, the microcontroller U2 is programmed to follow the pattern applied to the SYNC line. If GP0 is low when polled by the microcontroller U2, the microcontroller initiates its own flashing sequence, triggering Q2 and taking the SYNC line low at the beginning of each flashing sequence. This synchronizing circuit allows any number of driver circuits connected to a common SYNC line to coordinate their flashing patterns without resort to a central controller.

The SYNC line has an overcurrent protection circuit 44. To protect the LED driver circuit 10, transistor Q3 is arranged to turn on when the current through transistor Q2 and resistor R14 exceeds approximately 500 milliamps. This would occur if vehicle power were mistakenly applied to the SYNC line. This improper connection is detected by the overcurrent circuit when the microcontroller U2 attempts to take the SYNC line low by triggering transistor Q2 with a logic high at I/O port GP2. With Q2 turned on, vehicle power would flow through transistor Q2 and resistor R14 to ground, generating the over-current condition. Q3 turns on in response to excess current flow through R14 and applies a logic level low to I/O port GP1. The firmware responds to a logic level low at I/O port GP1 by removing the logic level high from I/O port GP2, turning off transistor Q2. This would occur at the beginning of each attempted flashing cycle, protecting the LED driver circuit 10 until the improper SYNC line connection is corrected.

The illustrated LED driver circuit 10 includes an input filter and reverse polarity protection provided by capacitor C2 and diode D1, respectively. Diode D6, capacitor C6 and resistors R2 and R18 provide a 5-volt power supply for the electronics including U1 and U2. Capacitors C3, C4, C5, C8 and C9 filter vehicle power applied to the switching regulator U1.

The illustrated LED driver circuit 10 also includes a phase selection input 46 to the microcontroller U2 at I/O port GP5. Any flashing pattern is a series of light emissions ("signal phase") separated by spaces ("resting phase") as best illustrated in FIG. 7. Firmware for the illustrated LED driver circuit 10 generates a signal phase comprising two short bursts followed by a longer pulse. The short/short/long signal phase of the light pattern alternates with a 400 mS resting phase. Each microcontroller U2 has an internal clock that governs activation of the I/O port GP4 to turn on the switching regulator U1 to energize the current source and generate the light pattern. The illustrated light pattern consists of signal and resting phases that may coincide with Ø1 or Ø2 of an internal phase clock in the microcontroller. Multiple light sources that emit light simultaneously and are off simultaneously are considered to be in-phase. Light sources that are on when the other light sources are off are considered to be out of phase. The microcontroller U2 is pre-programmed to initiate each light-generating portion of the flashing cycle coordinated with the leading edge of Ø1 (shown in FIG. 7 as Ø1CTRL). The microcontroller U2 is programmed to sense the logic state I/O port GP5. When GP5 is taken low by application of ground potential to pin 10 of J4, the microcontroller switches the triggering point of the light-generating portion (signal phase) of the light pattern it produces to the leading edge of the other phase. This is the "Set the Flash Timer for Phase 2" step in FIG. 5. The light pattern will be the same (short/short/long), but instead of triggering the light-generating portion (signal phase) of the flash pattern on the leading edge of Ø1, the light-generating portion of the flash pattern is triggered by the leading edge of Ø2. This produces an opposing on/off flashing pattern or wig-wag effect with light sources triggering on the leading edge of Ø1.

Figure 9A:
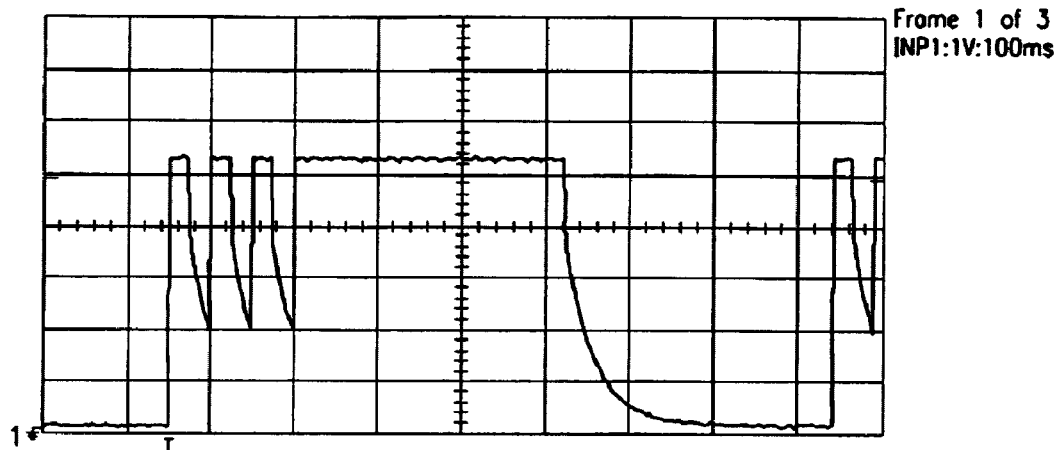
FIG. 9A illustrates the voltage developed across a pair of LEDs produced by the LED driver circuit of FIGS. 1–1B with respect to time.
Figure 9B:
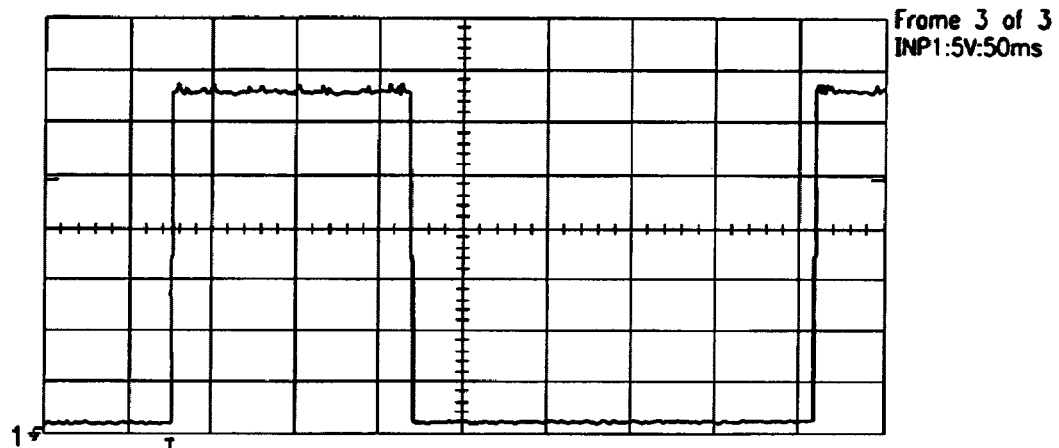
FIG. 9B illustrates the voltage developed across a 12 LED series array produced by one channel of the four-channel LED driver circuit of FIGS. 8–8D.
Figure 9C:
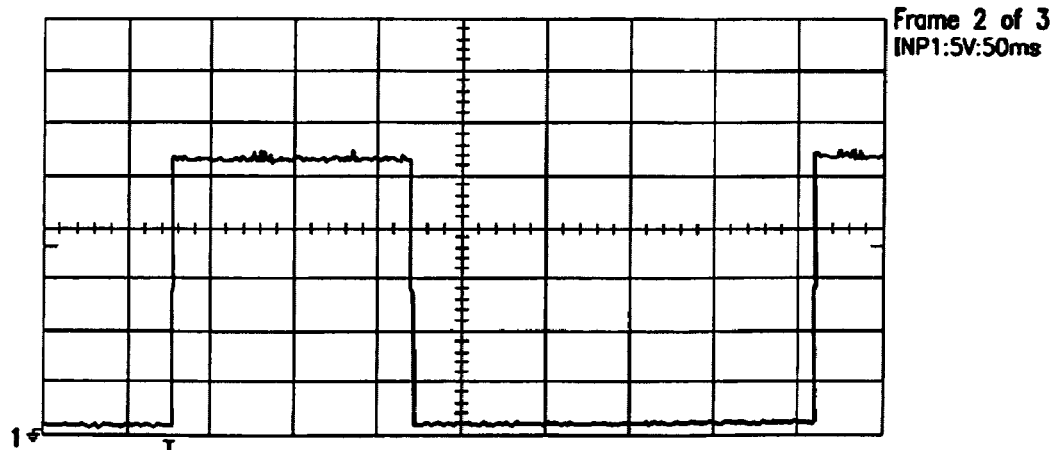
FIG. 9C illustrates the voltage developed across an 8 LED series array produced by one channel of the four-channel LED driver circuit of FIGS. 8–8D.

This feature allows the user to configure individual LED driver circuits in the illustrated network of driver circuits connected to a SYNC line to flash in phase or out-of-phase with the other driver circuits. The microcontroller U2 is programmed to use the same phase trigger until the status of GP5 changes again. It should be noted that the respective internal clocks of the several driver circuits are synchronized by the procedure described above whether they initiate the light-generating portion of the flash pattern on Ø1 or Ø2. The output voltage of the LED driver circuit 10 across a series pair of LEDs is shown in FIG. 9A.

Most conventional emergency vehicle warning light systems control multiple light emitters by use of a central controller. The central controller is connected to the multiple light sources to control their energization and thus, their light output. The light patterns for each light source and the sequence of their light output is coordinated by the central controller.

Figure 2:
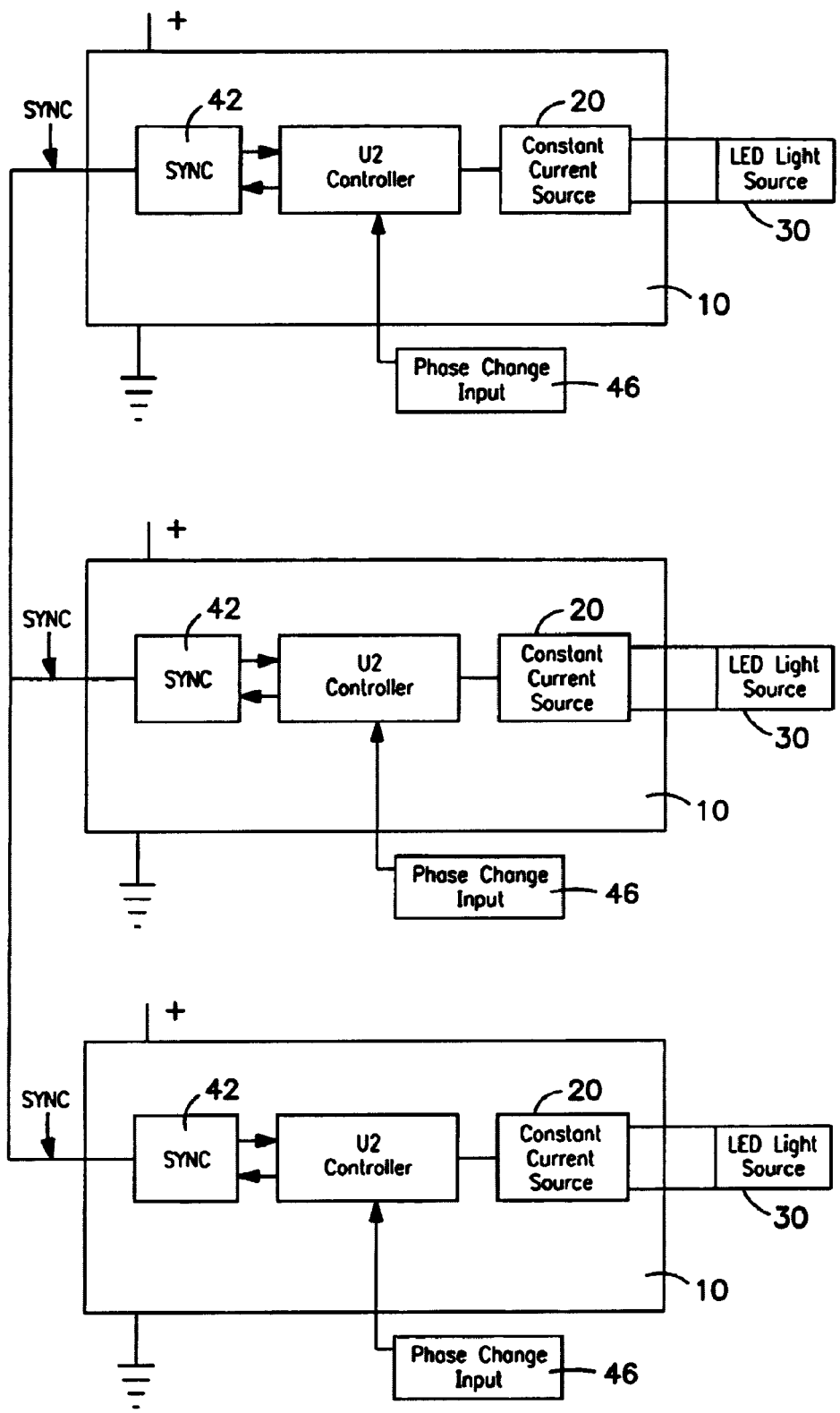
FIG. 2 is a schematic of a warning light system incorporating three of the exemplary LED driver circuits of FIG. 1 shown in functional block diagram.

The present invention provides an alternative warning light array that does not require a central controller. In the exemplary LED driver circuit 10 described above, each driver circuit 10 in the array includes a microcontroller pre-programmed with a pattern, which the microcontroller applies to a current source. The constant current source 20 energizes the LED light source 30 to produce a corresponding light emission pattern. Multiple discrete driver circuit 10/light source 30 assemblies may be coordinated by making the timing sequence of the light pattern generated by each microcontroller U2 responsive to the state of a SYNC line connecting the several driver circuit 10/light source 30 assemblies as shown in FIG. 2. Although all of the microcontrollers and associated driver circuitry are substantially identical, variations in the tolerances of individual components and physical conditions such as temperature will result in differing response times. Without synchronization, the differing response times would result in uncoordinated flashing from the several driver circuit 10/light source 30 assemblies.

In the exemplary network shown in FIG. 2, the first microcontroller to initiate its flashing sequence and trigger its transistor Q2 to take the SYNC line low becomes the "master" and is followed by the other micro-controllers, which trigger their flashing sequence from the "master" pattern placed on the SYNC line. The driver circuit in accordance with the present invention contemplates two embodiments. A first embodiment comprises a three-wire connection including a SYNC line as illustrated in FIGS. 1, 1A, 1B and 2 and described above. The three-wire embodiment includes firmware with at least one pre-programmed flash pattern and is responsive to the condition of the SYNC line for synchronizing multiple three-wire driver circuits 10 in the absence of central control.

Figure 3:
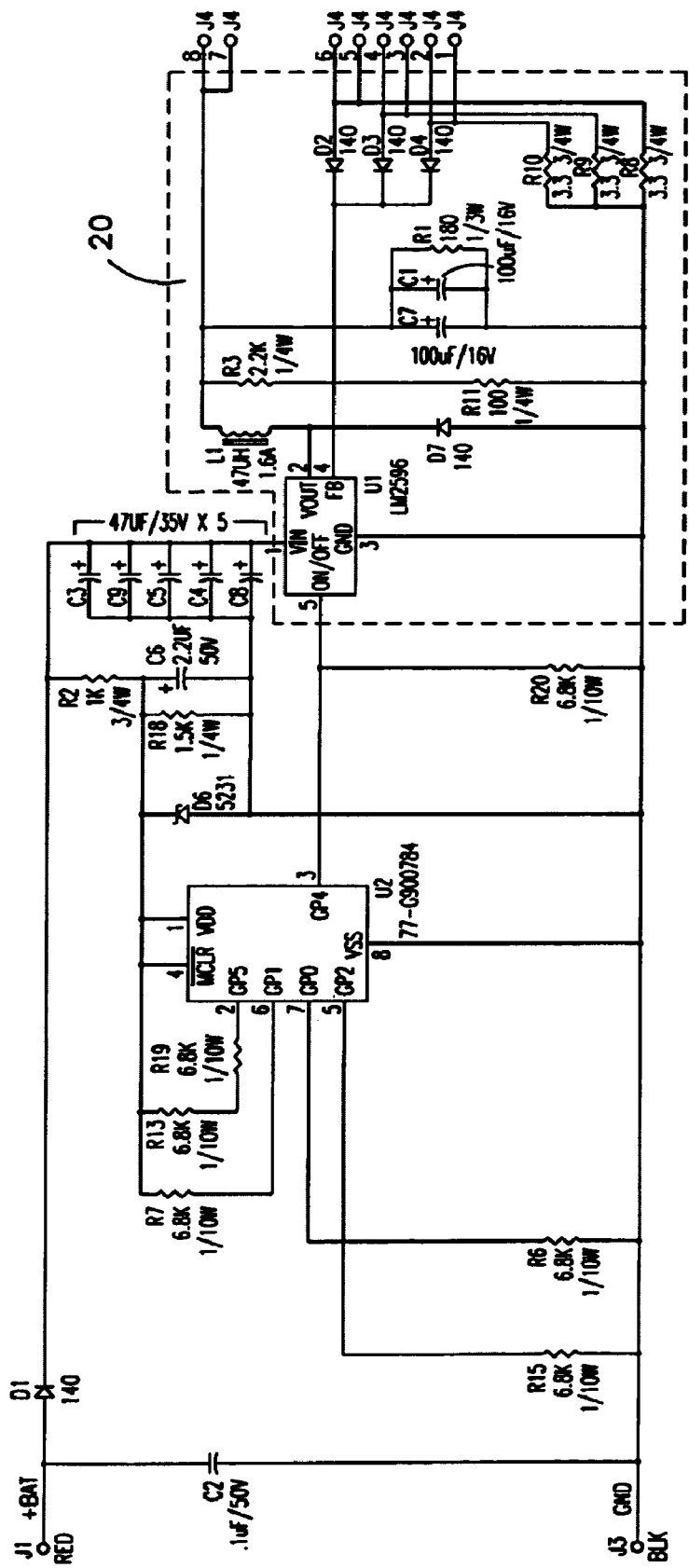
FIG. 3 is an electrical schematic of an alternative LED driver circuit exemplary of several aspects of the present invention.
Figure 4:
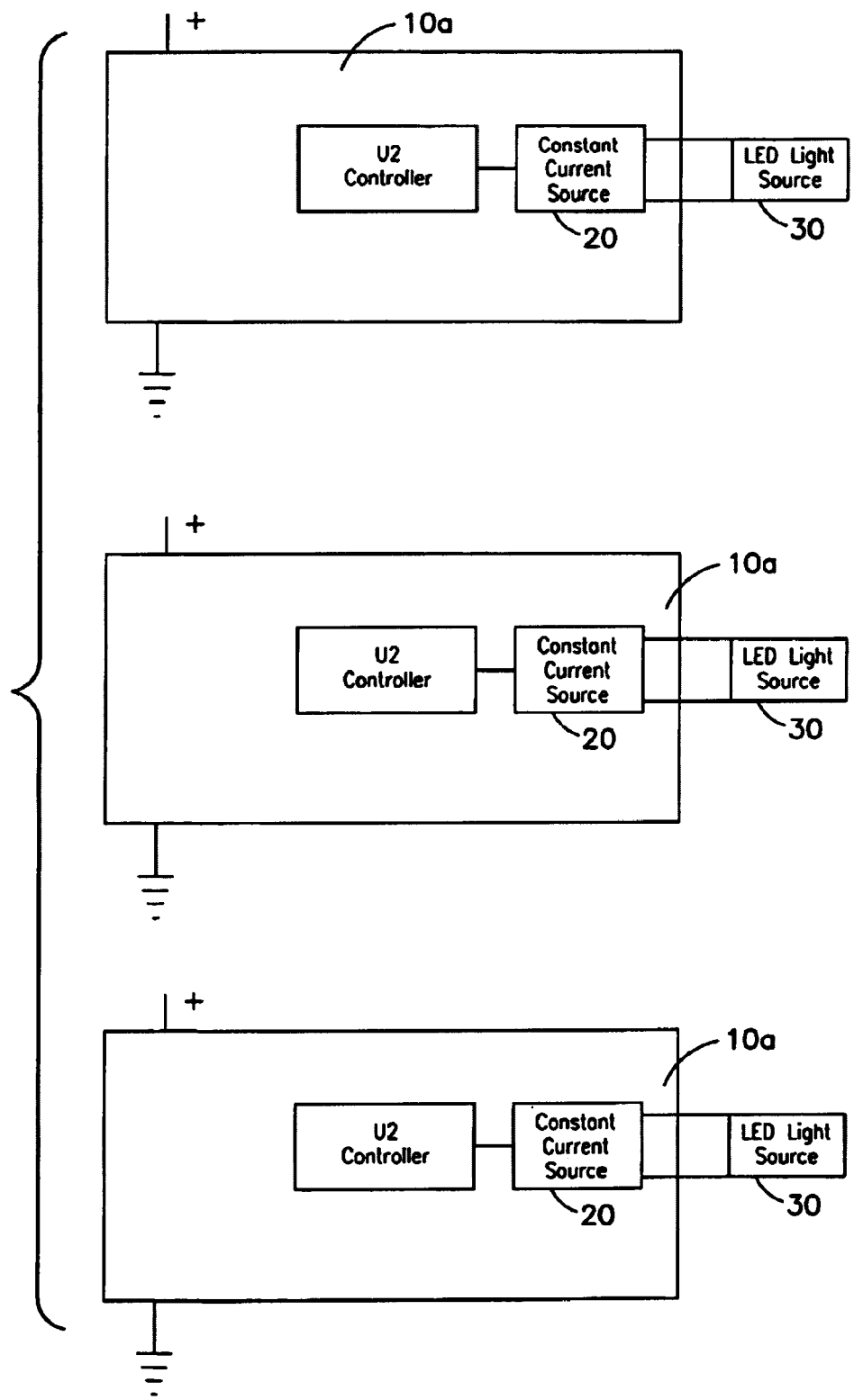
FIG. 4 is a schematic of a warning light system incorporating three of the exemplary LED driver circuits of FIG. 3 shown in functional block diagram.
Figure 5:
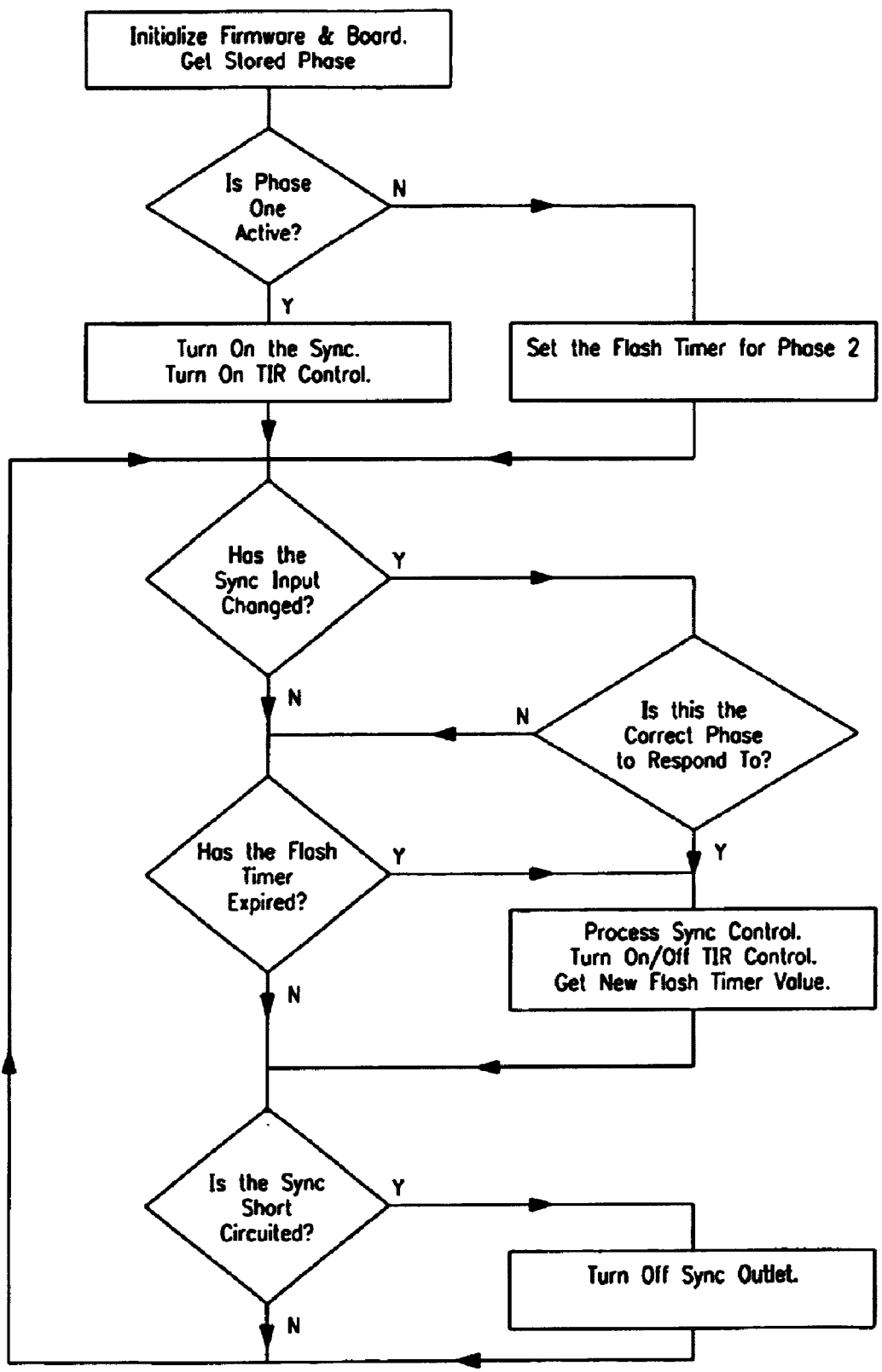
FIG. 5 is a firmware flow diagram for the LED driver circuit of FIGS. 1–1B.
Figure 6:
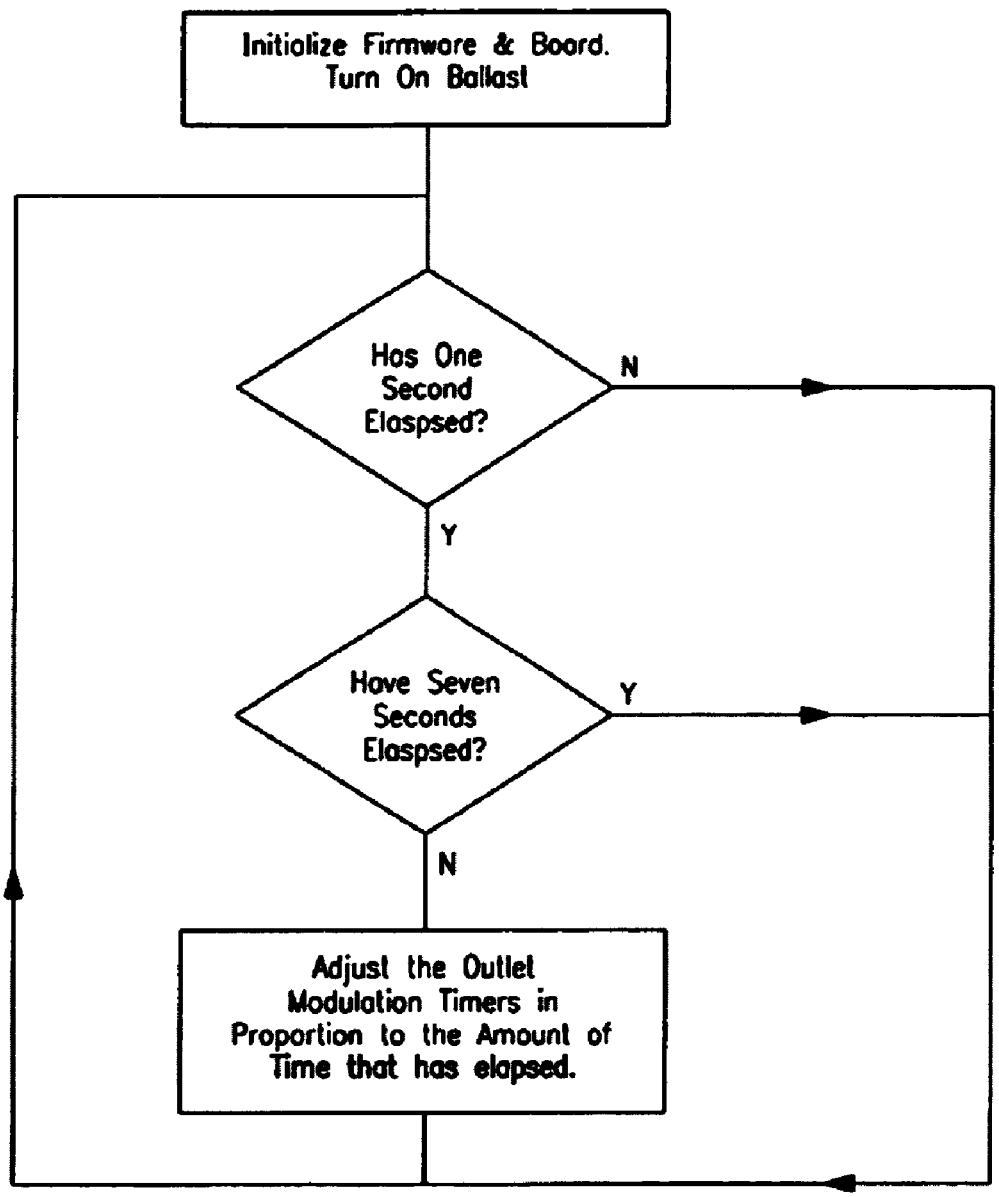
FIG. 6 is a firmware flow diagram for the LED driver circuit of FIG. 3.

A second embodiment of an LED driver circuit 10a, illustrated in FIGS. 3, 4 and 6 comprises a two-wire connection to the vehicle, the two wires being power and ground. In the two-wire LED driver circuit 10a the firmware does not include a pre-programmed flashing pattern and the controller U2 is not responsive to the condition of a SYNC line. Light emission from a light source 30 connected to the two-wire embodiment of the driver circuit 10a is coordinated by application of vehicle power to the driver circuit under central control. Application of vehicle power to the LED driver circuit 10a through diode D1 initializes microcontroller U2. The microcontroller U2 is programmed to apply an ON/OFF signal to the switching regulator U1 of the constant current source 20. The duty cycle of this ON/OFF signal determines the average current through a series pair of load LEDs connected to each of the three available output resistors R8, R9 and R10.

In accordance with an aspect of the invention, the constant current source 20 of the two-wire driver circuit is configured to apply an overdrive current to the LED light source. The term "overdrive current" as used in this application means a current in excess of the rated average current specified for the LED by the manufacturer. For example, for a given thermal design, a Luxeon™ 1 watt LED from Lumileds of San Jose, Calif. has a rated DC forward current of between 350 mA and 385 mA, depending on color. An overdrive current applied to a Luxeon one watt LED means a current above the rated forward current for the LED up to the peak pulsed forward current for the LED, which is in this case between 500 mA and 550 mA. In the case of a Luxeon™ one watt LED whose rated forward current of 350 mA and a peak pulsed forward current of 500 mA, an overdrive current would be in the range of between 351 mA and 500 mA.

Those of skill in the art will recognize that the current handling capacity of an LED is closely related with the thermal design of the apparatus containing the LED. The forward current ratings for LEDs assume a that the assembly will be able to dissipate a certain amount of heat. An LED assembly that is more efficient at dissipating heat will have a larger forward current rating, while an LED assembly that cannot dissipate as much heat as that assumed by the manufacturer will necessarily have a lower forward current rating. In the context of this application, the term overdrive current is intended to mean a current in excess of the maximum safe average current $I_{Avg}$, that can be applied continuously to an LED assembly without accumulating excess heat in a given thermal design.

It should be noted that the constant current source 20 of the two wire LED driver circuit 10a is identical to the constant current source 20 of the three wire LED driver circuit 10. The discussion herein of the constant current source 20 is equally applicable to both circuits.

The luminous flux emitted by an LED is proportional to the current through the LED up to the peak pulsed current. Current in excess of the peak pulsed current $I_{Peak}$ may cause failure of the LED. Light output from an LED may be maximized for short periods of time by applying an overdrive current to the LED. The duration of the overdrive current must be limited, however, to prevent overheating of the LED. Overheating will result in premature degradation of the light output and/or failure of the LED.

One aspect of the invention relates to an LED driver circuit 10a that includes a constant current source 20 configured to apply an overdrive current to the LEDs in the light source 30 for a pre-determined initial period of any light emission. Following the pre-determined initial period, the microcontroller U2 of LED driver circuit 10a is programmed to modulate the duty cycle of the ON/OFF signal applied to the switching regulator U1 such that the current applied to the LED load is gradually reduced to approximately the rated DC forward current value for the LED. Thus, light emissions of a duration less than the pre-determined initial period will be of maximum intensity. If the light pattern includes a period of light emission longer than the pre-determined initial period, the overdrive current will be applied to the LEDs for the pre-determined initial period and then the current applied to the LED load will be reduced over time to a sustainable average current value.

The illustrated embodiments of LED light source use the Luxeon™ one watt LED, the pre-determined initial period is one second and the overdrive current is approximately 450 mA, or approximately 20% above the forward rated current. A 100% duty cycle (constant on) signal applied to the ON/OFF input of the switching regulator U1 produces a current of approximately 450 mA through a series pair of LEDs connected between J4 pins 7/8 and one of J4 pins 1/2, 3/4 or 5/6. After one second, the microcontroller U2 reduces the duty cycle of the ON/OFF signal from 100% to approximately 40%. The resulting average current through the LEDs is reduced to a sustainable value of below 300 mA.

One aspect of the invention relates to firmware for the microcontroller U2 that applies a square wave to the ON/OFF input of U1. The duty cycle of this square-wave is modulated to control the average power applied to the LEDs. The firmware is programmed to apply a 100% duty cycle to the ON/OFF input of U1 for one second followed by a transition period during which the duty cycle of the square-wave is modulated downward to a 40% duty cycle. This is the step of "Adjust the Outlet Modulation Timers in Proportion to the Amount of Time that has Elapsed" step of FIG. 6. In the illustrated embodiment the transition period is approximately 7 seconds. An observer cannot detect the change in light output resulting from this gradual change current applied to the LEDs.

This allows the two-wire LED driver circuit 10a to be energized in any desired pattern by a central controller where the first second of energy applied through the LED light source 30 will produce maximum light output for the purpose of getting attention in a warning light array. A light pattern including, for example, a steady application of energy to the LED through the driver circuit (a "steady on") will not harm the LEDs because the microcontroller firmware in the driver circuit ramps down current applied through the LED light source to an appropriate sustainable level. In the absence of this firmware control, a central controller applying a "steady on" or pattern including application of energy through the LED load for greater than 1 second may overheat the LEDs and shorten their life. Since most warning light patterns do not require sustained light output for greater than 1 second, the LED driver circuit in accordance with the present invention will produce maximum light output for warning light purposes. The 1 second time limit is used here for the purposes of explanation. The time than an overdrive current may be applied depends on the value of the current and the thermal design of the LED light assembly.

Figure 8:
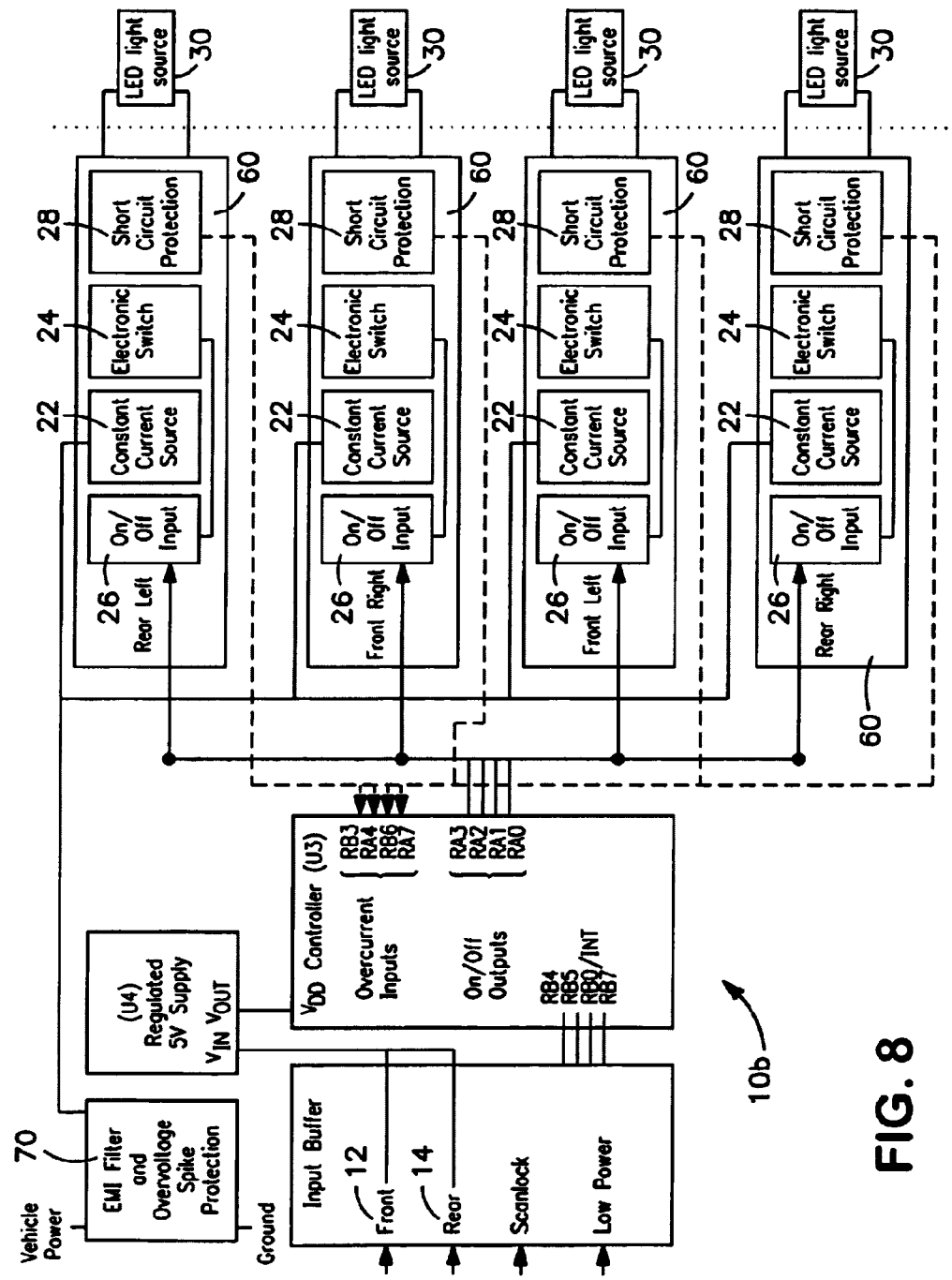
FIG. 8 is a combined schematic and functional block diagram of a four-channel LED driver circuit exemplary of several aspects of the present invention.

A further exemplary embodiment of an LED driver circuit in accordance with further aspects of the invention is illustrated in FIGS. 8, 8A–8D, 9B, 9C and 10. This embodiment will be referred to as the four-channel driver circuit 10b. The four-channel driver circuit 10b is configured to provide energizing current to two front and two rear channels 60. As shown in FIG. 8, each channel 60 includes a constant current source 22 responsive to an ON/OFF input 26 to produce an energizing current. The constant current source 22 incorporates a switching regulator U6 in a boost configuration with components selected to generate a constant current through the LED light source over a range of voltages between 18 and 45 volts. Each channel 60 further includes an electronic switch 24 responsive to the same signal as the ON/OFF input 26. The electronic switch 24 is arranged between the output of the constant current source 22 and the LED light source 30. This arrangement allows the LED light source 30 to be isolated from the constant current source 22 in response to a signal from the microcontroller U3. This circuit configuration provides very sharp turn-on and turn-off as illustrated by the voltage measurements across the LED light source in FIGS. 9B and 9C.

Each channel 60 further includes an over-current detection circuit 28 to protect the four-channel driver circuit 10b against a short circuit in the output stage of each channel 60. Over-current protection for each channel is particularly important in the four-channel driver circuit 10a due to the configuration of the boost-type constant current source 22. In a boost configuration constant current source 22, vehicle power is applied to the load through the boost coil L8. Without over-current detection and an electronic switch 24 responsive to the microcontroller U3 to isolate the output stage, a short circuit in the output stage would quickly draw excess current through coil L8 and destroy the driver circuit channel.

Figure 8A:
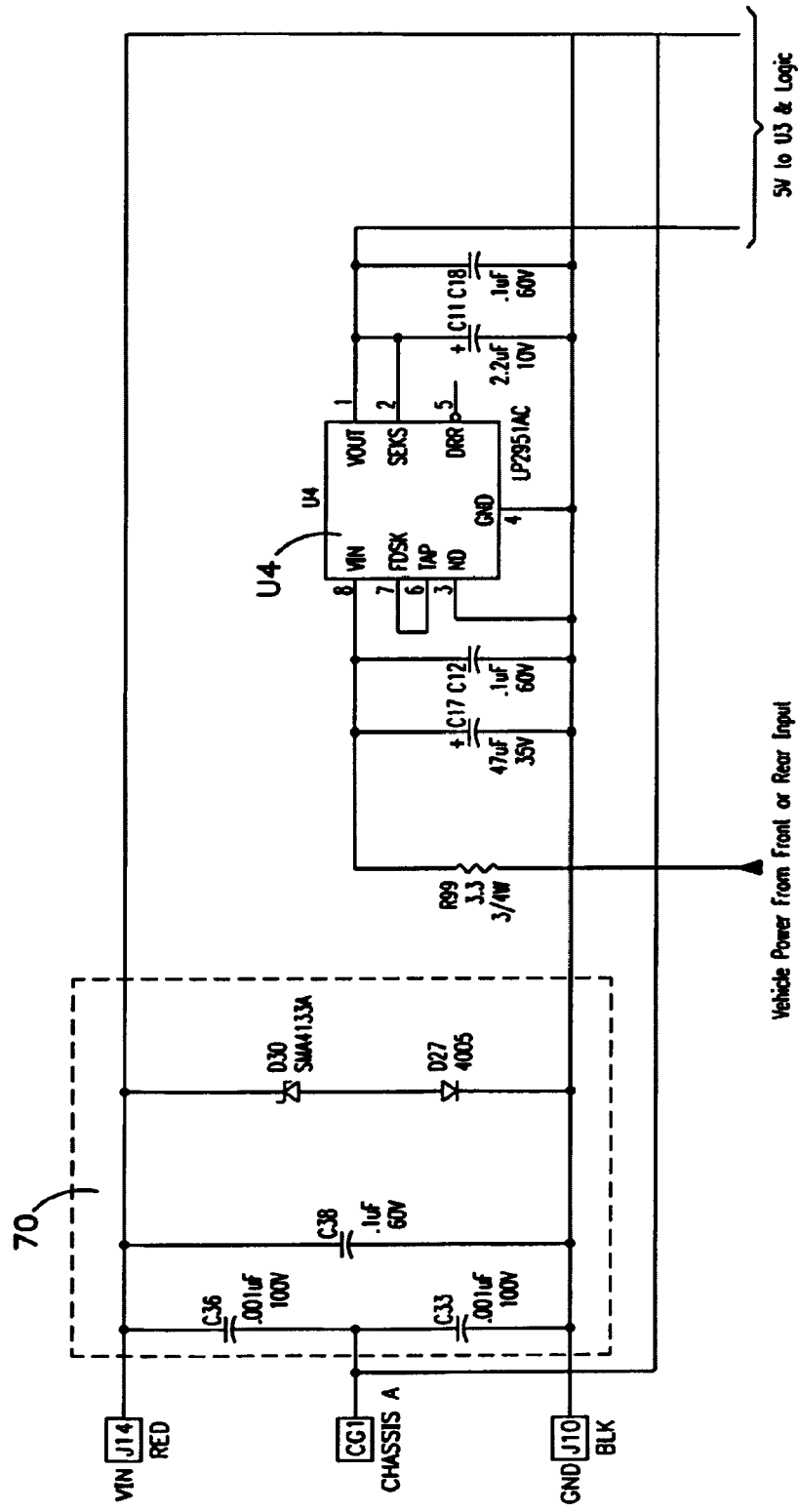
FIG. 8A is an electrical schematic of the EMI filtration, reverse polarity protection and internal regulated power supply portions of the four-channel LED driver circuit of FIG. 8.

With reference to FIGS. 8 and 8A, vehicle power is distributed to each of the four channels 60 after being processed through an electromagnetic interference (EMI) filter and over-voltage spike protection circuit 70. This conditioned vehicle power is distributed through a diode (D18 in FIG. 8C) to an EMI filter 72 preceding the constant current source 22 in each channel 60. With reference to FIG. 8A, a regulated 5-volt power supply U4 produces 5-volt power for the microcontroller U3 and logic circuitry. As best seen in FIG. 8, the regulated 5-volt power supply U4 receives power from front or rear inputs 12, 14 to the four-channel driver circuit 10b. These inputs 12, 14 may be activated by switches accessible to the operator of an emergency vehicle or the like. Activation of a front or rear input 12, 14 has two functions. First, vehicle power is delivered through the input to the regulated 5-volt power supply U4, which in turn delivers power to the microcontroller U3 and logic circuitry. Second, the activated input (12 or 14) tells the microcontroller U3 which pair of channels (front or rear) to energize. The microcontroller U3 "wakes up" and monitors input I/O ports RB4 and RB5 to identify which of the front or rear switches has been activated. A further switched input labeled "Low Power" permits the four channels 60 to be operated at a low power function. This mode might be used for standard traffic duty where less than maximum warning light intensity is desirable and preservation of electrical power over long periods of stationary duty is important.

Figure 8B:
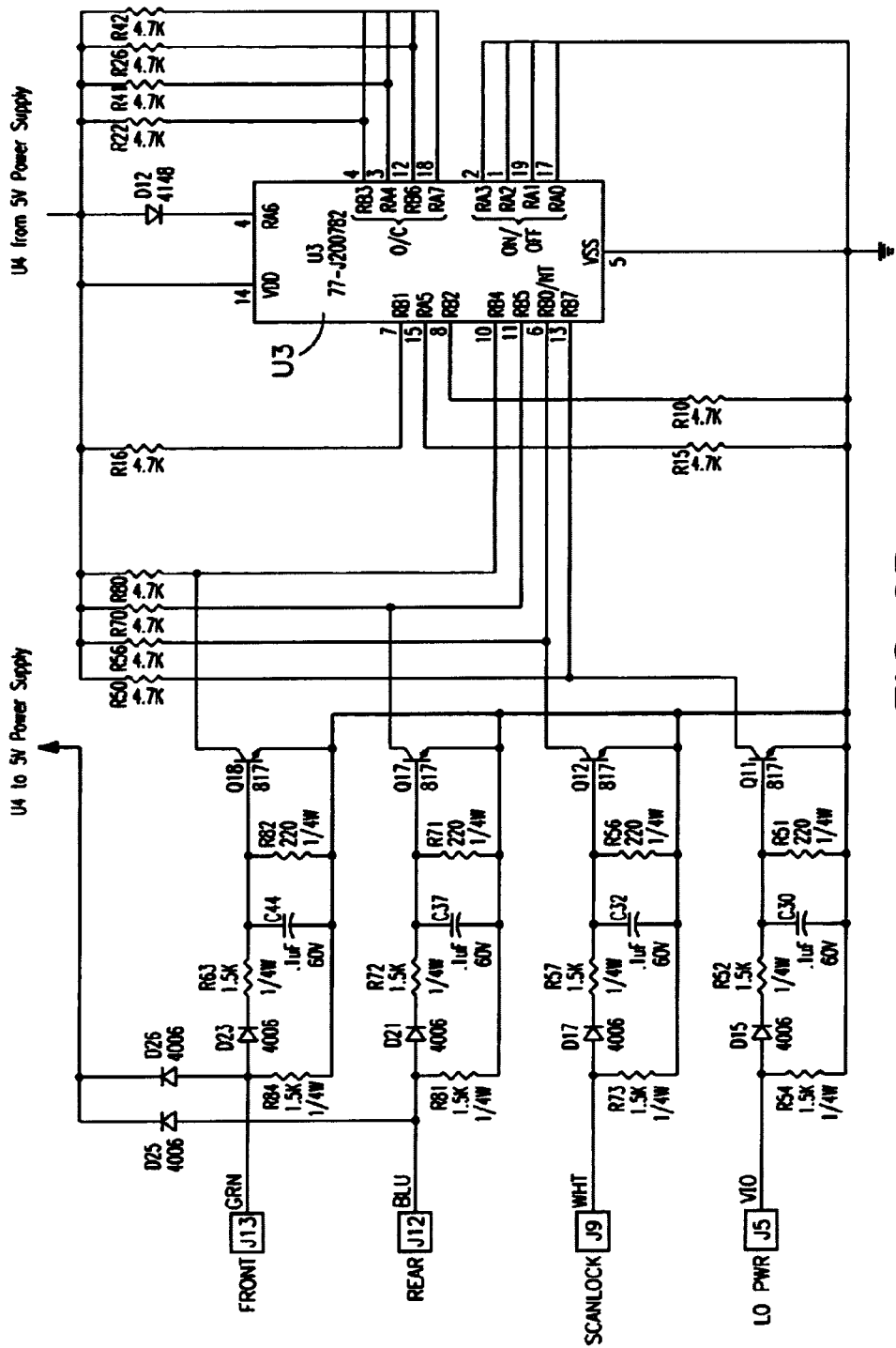
FIG. 8B is an electrical schematic of the input and microcontroller portions of the four-channel LED driver circuit of FIG. 8.
Figure 8C:
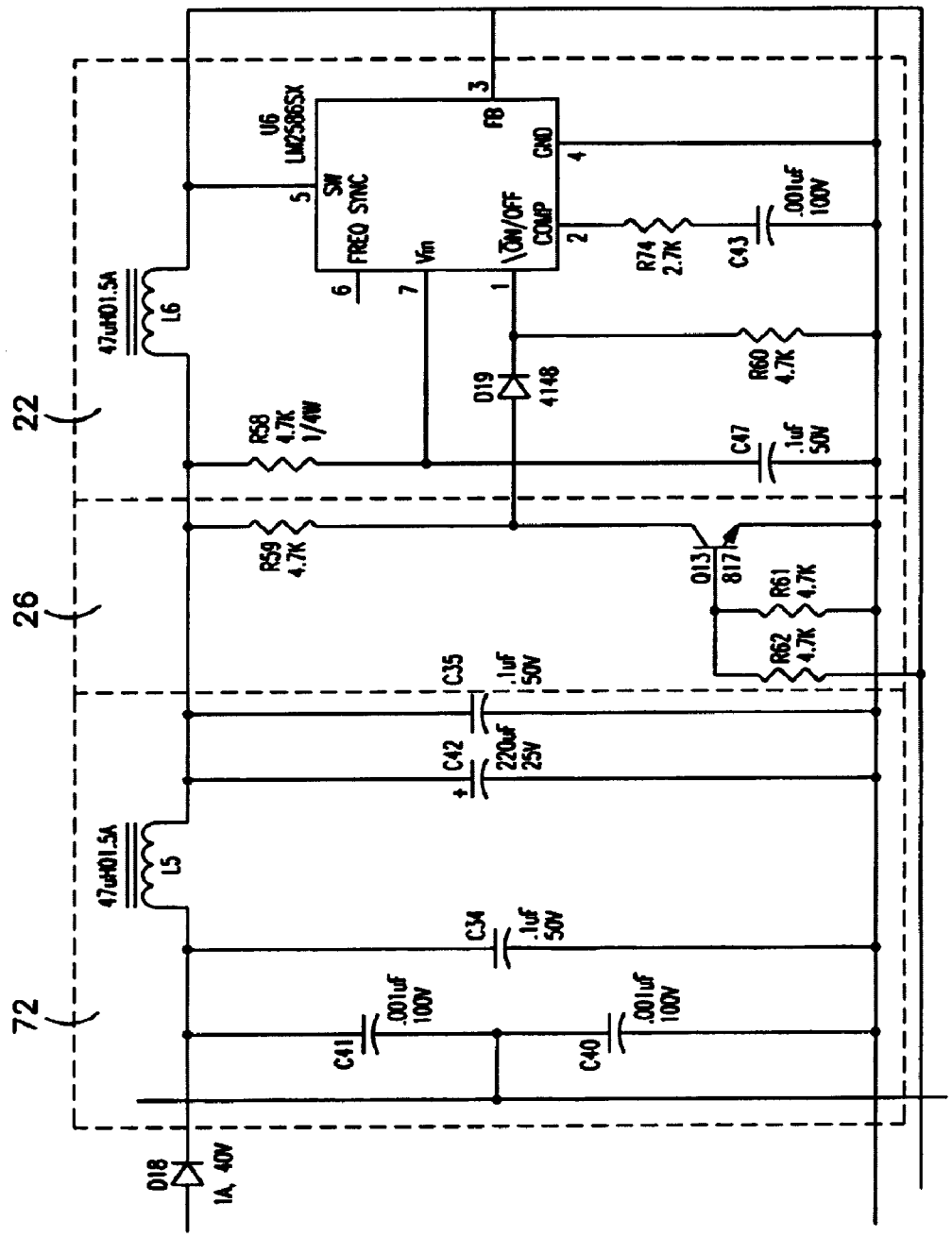
FIGS. 8C and 8D are an electrical schematic of one channel of the four-channel LED driver circuit of FIG. 8.

As best seen in FIG. 8C, the constant current source 22 uses a switching regulator U6 in a boost-circuit format. The switching regulator U6 is a model LM2586SX from National Semiconductor configured to operate at 150 KHz. The switching regulator U6 intermittently connects the output end of the coil L6 to ground. When the coil L6 is connected to ground, it is charged by vehicle power and when the output end is disconnected from ground, the output end of the coil L6 flies above vehicle power, discharging this higher voltage through diode D24 (see FIG. 8D) into output capacitors C44 and C45. The output capacitors C44 and C45 store this potential and smooth the flow of current to the LEDs (not illustrated) connected across the output (J8 and J11 in FIG. 8D) of the constant current source 22.

Figure 8D:
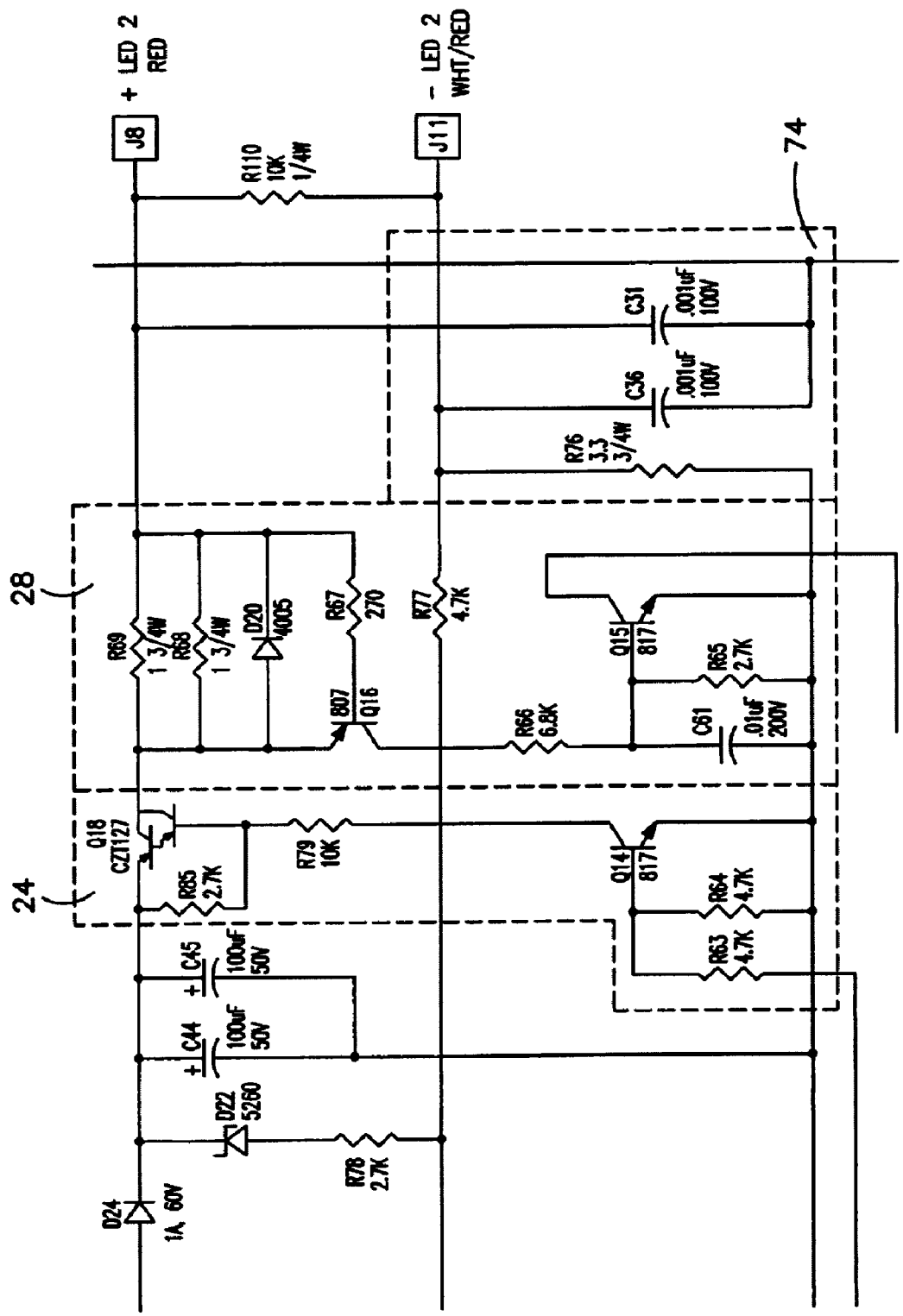

As shown in FIGS. 8 and 8D, an electronic switch 28 comprising a PNP Darlington Pair Q18 is arranged between the output of the constant current source 22 and the LED light source 30. The Darlington Pair Q18 is turned on by transistor Q14 responsive to the ON/OFF signal from the microcontroller U3. When turned on, the Darlington Pair Q18 conducts energizing current to the LED light source 30. When turned off, the output of the channel 60 is effectively isolated from the constant current source 22. Transistors Q13 (FIG. 5C—applies the ON/OFF input to the switching regulator U6) and Q14 (FIG. 8D—turns on Darlington Pair Q18) are simultaneously turned on by the ON/OFF signal from the microcontroller U3. Shottky diode D22 and resistor R78 provide a voltage clamp at 45 volts which operates when the output of the current source 22 is open.

An over-current protection circuit 28 protects each channel 60 against a short circuit between the positive side of the output and ground (best seen in FIG. 8D). Under normal operation, the base of transistor Q16 will be at a high voltage level keeping PNP transistor Q16 turned off. Should a ground occur at the output, the base of transistor Q16 will be brought low, turning it on and applying current through resistor R66, capacitor C61 and resistor R65, turning on transistor Q15 and applying a logic level low to the over-current input (RB3, RA4, RB6, or RA7) of microcontroller U3 associated with that channel. An over-current input applied to the microcontroller U3 will cause the controller to turn off that channel by removing the ON/OFF signal from transistors Q13 and Q14. Thus, each channel 60 is protected from short circuit.

Each channel 60 further comprises a EMI filter 74 connected across the output as shown in FIG. 8D. EMI filtration is very important, particularly in emergency vehicles and aircraft that rely on radio frequency communications. The switching regulators U6 operate at radio frequencies and can cause interference with vehicle electrical systems if not properly filtered.

Each of the four channels 60 is identical to the channel illustrated in FIGS. 8A–8D and operates on the same principles, so the explanation of one channel holds true for all channels.

FIGS. 8 and 8B illustrate the input and microcontroller portions of the four-channel driver circuit 10b. The microcontroller U3 is a microchip PIC16F628-041/P model 8-bit CMOS microcontroller. The microcontroller U3 monitors the over-current input from each channel at I/O ports RB3, RA4, RB6 and RA7. The microcontroller U3 turns on and off each channel 60 to produce the desired light-emission pattern to an LED light source 30 connected across the output of that channel. A logic level high on I/O port RA0, RA1, RA2 or RA3 turns on the associated channel by applying a logic level low to the ON/OFF input of a switching regulator (U6 in the illustrated channel). A logic level low is simultaneously applied to the base of the Darlington Pair Q18 by actuation of transistor Q14. Removal of the logic level high ON/OFF signal by the microcontroller U3 simultaneously turns off the switching regulator U6 and the Darlington Pair Q18 to isolate the LED light source 30 from the constant current source 22. Current flow through R76 applies the feedback FB signal of approximately 1.23 volts when the current through resistor R76 equals approximately 375 mA. With an LED light source comprising 8–12 LEDs connected across the output, a feedback signal will be generated by current flow through R76 which will limit the current produced by the constant current source to approximately 375 mA.

Figure 10:
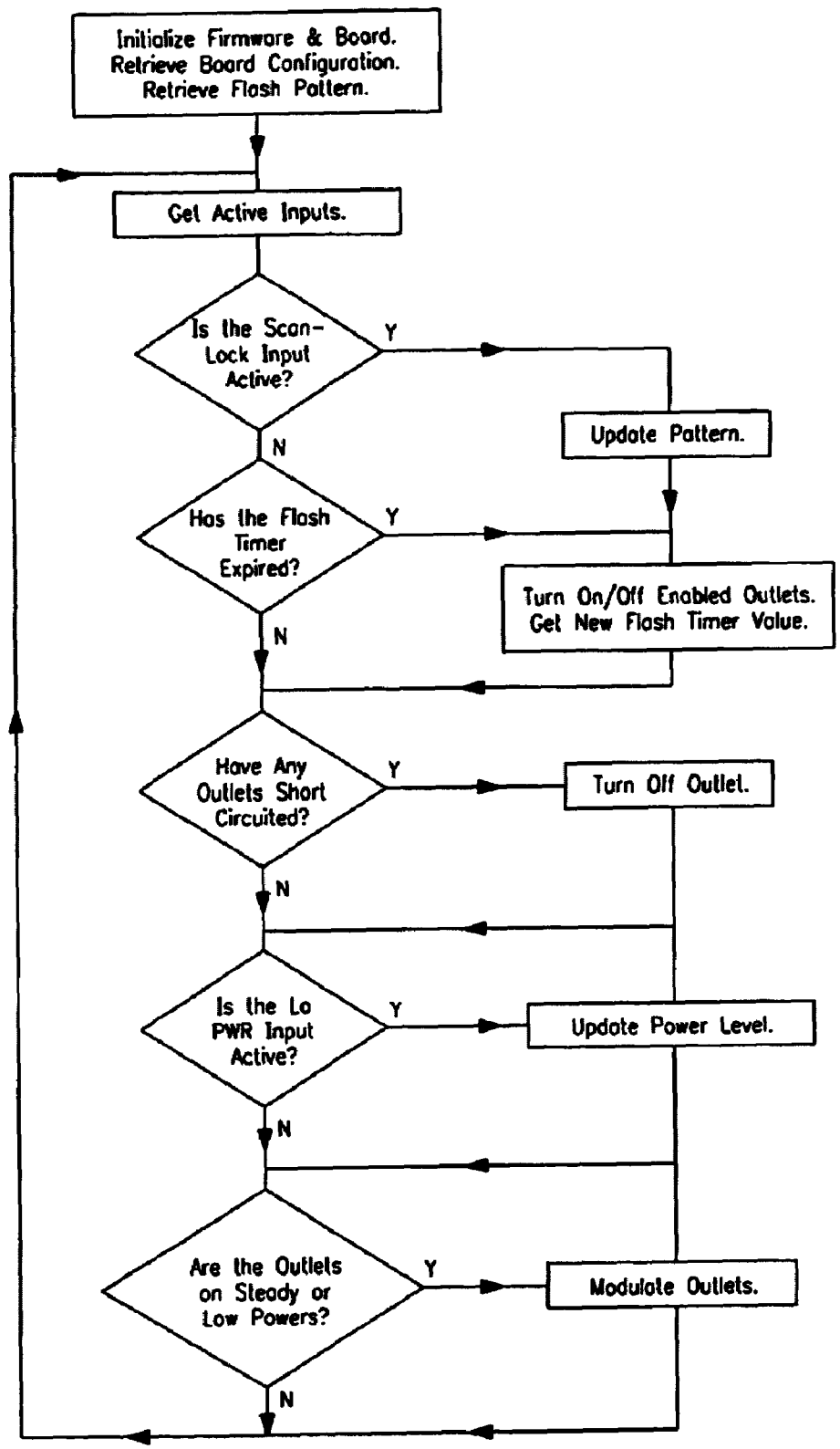
FIG. 10 is a firmware flow diagram for the four-channel LED driver circuit of FIGS. 8–8D.

The microcontroller U3 is programmed with multiple light output patterns. The patterns are arranged in memory such that a change of state of the SCANLOCK™ input causes the microcontroller firmware to cycle through the available flash patterns (see FIG. 10). The last flash pattern selected is applied through the microcontroller U3 to the active front or rear channels. The microcontroller U3 firmware is configured to monitor the SCANLOCK™ input to look for a change in state indicative of a request to increment or decrement to the next flash pattern. FIG. 10 is a firmware flow diagram illustrating the major steps in the firmware for the four-channel driver circuit 10b.

In low power operation, the duty cycle of the ON/OFF signal applied to the switching regulator is modified such that full power (in this case approximately 375 mA) is not applied through the LED light sources connected across the outputs of each stage 60.

While exemplary embodiments of the foregoing invention have been set forth for purposes of illustration, the foregoing description should not be deemed a limitation of the invention herein. Accordingly, various modifications, adaptations, and alternatives may occur to one skilled in the art without departing from the spirit and the scope of the present invention.

What is claimed is:

1. A driver circuit for energizing a plurality of LEDs, said driver circuit comprising:
    a constant current source responsive to a first input to produce a current and connectable to an emitter comprising a plurality of LEDs, said constant current source configured to monitor an electrical current through the plurality of LEDs and limit said current to a predetermined value;
    a controller programmed to;
        monitor the state of a synchronization input to the controller;
        provide said first input to said constant current source in a predetermined pattern, initiation of said pattern alternatively controlled by the controller or by a change of state of said synchronization input; and
        produce a synchronization output indicating initiation of said pattern by said controller; and
    a synchronization circuit electrically connected to a synchronization line, said synchronization circuit responsive to a change in the electrical potential present on the synchronization line from a first electrical potential to a second electrical potential to provide said synchronization input to the controller and responsive to said synchronization output from the controller to apply said second electrical potential to said synchronization line,
    wherein initiation of said pattern is triggered by the change of electrical potential on the synchronization line if said synchronization input is present before the controller produces said synchronization output and initiation of said pattern is triggered by the controller if said synchronization input is not present before the controller produces said synchronization output.

2. The driver circuit of claim 1, wherein said pattern comprises:
    a signal phase; and
    a resting phase, and
    wherein said controller is programmed to monitor the state of a phase change input, said phase change input having applied thereto a first potential corresponding to a first state and a second potential corresponding to a second state, and to initiate said pattern with said signal phase or said resting phase until said phase change input changes state and to initiate said pattern with the other of said signal phase or said resting phase after said phase change input changes state, said controller continuing to initiate said pattern with the other of said signal phase or said resting phase until said second potential is again applied to said phase change input.

3. The driver circuit of claim 1, wherein said synchronization circuit comprises a first electronic switch having an off state an on state, a change of state of said first electronic switch providing said synchronization input to said controller and said first electronic switch is electrically connected to said synchronization line such that the state of said first electronic switch is dependent upon the electrical potential present on the synchronization line.

4. The driver circuit of claim 1, wherein said synchronization circuit comprises a second electronic switch having an off state and an on state, said second electronic switch is electrically connected to said synchronization line such that a change of state of the second electronic switch changes the electrical potential present on the synchronization line, the state of said second electronic switch being dependent upon the presence or absence of said synchronization output.

5. The driver circuit of claim 3, wherein said synchronization circuit comprises a second electronic switch having an off state and an on state, said second electronic switch is electrically connected to said synchronization line such that a change of state of the second electronic switch changes the electrical potential present on the synchronization line, the state of said second electronic switch being dependent upon the presence or absence of said synchronization output.

6. The driver circuit of claim 1, comprising an over current detection circuit for detecting current flow from the synchronization line to a ground potential, said over current detection circuit providing an over current input to said controller upon detection of current flow from the synchronization line to a ground potential in excess of a predetermined threshold.

7. A method for coordinating light emission from a plurality of warning light assemblies, each of said warning light assemblies comprising at least one light emitter and a driver circuit for applying a pattern of electrical energy to the at least one light emitter to produce a warning light signal, said method comprising:

sensing an electrical potential of a synchronization line to which each of the driver circuits are connected, the synchronization line having applied thereto a first potential corresponding to an absence of a synchronization signal from one of the driver circuits or a second potential corresponding to the presence of a synchronization signal from one of the driver circuits, said sensing performed by a first electrical circuit in each driver circuit;

generating a synchronization input to a controller in each said driver circuit corresponding to the presence of said second potential, said synchronization input generated by said first electrical circuit and occurring substantially contemporaneously with a change of the electrical potential of said synchronization line from said first potential to said second potential;

generating a synchronization output corresponding to commencement of application of the pattern of electrical energy to the at least one light emitter, said synchronization output generated by the controller in each driver circuit; and applying said second potential to the synchronization line, said applying performed by said first electrical circuit in each driver circuit and triggered by and substantially contemporaneously with the generation of said synchronization output, commencing application of the pattern of electrical energy to the at least one light emitter from the driver circuit of each warning light assembly, said commencing triggered by the generation of said synchronization input if said synchronization input has been generated prior to generation of said synchronization output by the controller of said driver circuit.

8. The method of claim 7, wherein said sensing comprises:

connecting an electronic switch in the first electrical circuit to generate said synchronization input coincident with a change of potential on said synchronization line from said first potential to said second potential.

9. The method of claim 7, wherein said applying comprises connecting a second electronic switch in said first electrical circuit to said synchronization line, said second electronic switch responsive to generation of said synchronization output to apply said second potential to the synchronization line.

10. The method of claim 7, comprising:

monitoring a current flow from said synchronization line to a ground potential at each driver circuit; and generating an overcurrent input to the controller of a driver circuit where said current flow exceeds a pre-established value.

11. A driver circuit for energizing a plurality of LEDs, each said LED having a maximum safe average current $I_{Avg}$, and a peak pulsed forward current $I_P$, said driver circuit comprising:

a constant current source responsive to the presence of a first input to provide an overdrive current $I_{OD}$ through said plurality of LEDs, said overdrive current $I_{OD}$ being greater than said maximum safe average current $I_{Avg}$ and less than or approximately equal to said peak pulsed forward current $I_P$; and a controller programmed to provide said first input to said constant current source at a 100% duty cycle for a first pre-determined time period, said controller programmed to modulate the duty cycle of said first input such that the average current applied to the LEDs is reduced from said overdrive current $I_{OD}$ to approximately said maximum safe average current $I_{Avg}$.

12. The driver circuit of claim 11, wherein the current applied to the LEDs is reduced gradually over a second pre-determined time period.

13. The driver circuit of claim 12, wherein said first pre-determined time period is approximately 1 second and said second predetermined time period is approximately 7 seconds.

14. The driver circuit of claim 11, wherein said overdrive current $I_{OD}$ is approximately 1.1 to 1.3 times greater than said maximum safe average current $I_{Avg}$.

15. The driver circuit of claim 11, wherein said overdrive current $I_{OD}$ is approximately 90 to 100 percent of said peak pulsed current $I_P$.

16. A method of energizing an LED to produce a warning light pattern, said LED having a maximum safe average current $I_{Avg}$ and a peak pulsed current $I_P$, said method comprising:

applying an overdrive current $I_{OD}$ to said LED for a first pre-determined time period of each energization of the LED, said overdrive current $I_{OD}$ being greater than said maximum safe average current $I_{Avg}$ and less than or equal to said peak pulsed current $I_P$; and reducing the current applied to said LED from said overdrive current $I_{OD}$ to said maximum safe average current $I_{Avg}$ if said energization of the LED has a duration in excess of said first pre-determined time period.

17. The method of claim 16, wherein said step of reducing comprises:

gradually reducing the current applied to said LED from said overdrive current $I_{OD}$ over a second pre-determined time period.

18. The method of claim 17, wherein said first pre-determined time period is approximately 1 second and said second pre-determined time period is approximately 7 seconds.

19. The method of claim 16, wherein said reducing comprises reducing a duty cycle of an on/off input to a constant current source configured to apply a constant current equal to $I_{OD}$ to said LED if provided with an on/off input having a 100% duty cycle.

20. A driver circuit for energizing a light emitter, said driver circuit comprising:
- an energizing circuit responsive to a first input to energize the light emitter;
- a controller connected and programmed to;
  - monitor the state of a synchronization input to the controller;
  - provide said first input to said energizing circuit in a predetermined pattern, initiation of said pattern alternatively controlled by the controller or by a change of state of said synchronization input; and
  - produce a synchronization output indicating initiation of said pattern by said controller; and
- a synchronization circuit electrically connected to a synchronization line, said synchronization circuit responsive to a change in the electrical potential present on the synchronization line from a first electrical potential to a second electrical potential to provide said synchronization input to the controller and responsive to said synchronization output from the controller to apply said second electrical potential to said synchronization line,
- wherein initiation of said pattern is triggered by the change of electrical potential on the synchronization line if said synchronization input is present before the controller produces said synchronization output and initiation of said pattern is triggered by the controller if said synchronization input is not present before the controller produces said synchronization output.

21. The driver circuit of claim 20, wherein said synchronization circuit comprises a first electronic switch having an off state an on state, a change of state of said first electronic switch providing said synchronization input to said controller and said first electronic switch is electrically connected to said synchronization line such that the state of said first electronic switch is dependent upon the electrical potential present on the synchronization line.

22. The driver circuit of claim 20, wherein said synchronization circuit comprises a second electronic switch having an off state and an on state, said second electronic switch is electrically connected to said synchronization line such that a change of state of the second electronic switch changes the electrical potential present on the synchronization line, the state of said second electronic switch being dependent upon the presence or absence of said synchronization output.

23. The driver circuit of claim 22, wherein said synchronization circuit comprises a second electronic switch having an off state and an on state, said second electronic switch is electrically connected to said synchronization line such that a change of state of the second electronic switch changes the electrical potential present on the synchronization line, the state of said second electronic switch being dependent upon the presence or absence of said synchronization output.

24. The driver circuit of claim 20, comprising an over current detection circuit for detecting current flow from the synchronization line to a ground potential, said over current detection circuit providing an over current input to said controller upon detection of current flow from the synchronization line to a ground potential in excess of a predetermined threshold.

* * * * *